Aug. 25, 1931.  R. D. DELAMERE  1,820,301
MEANS FOR CUTTING PLASTIC SUBSTANCES
Filed June 28, 1928  2 Sheets-Sheet 1
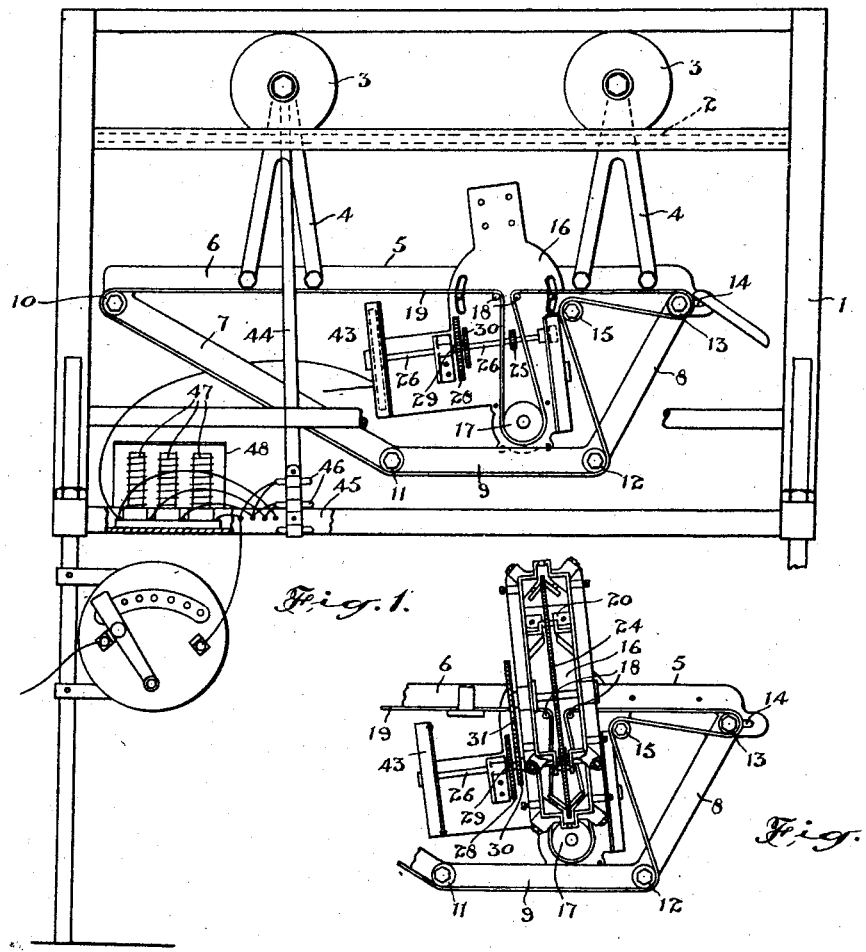
Inventor.
Rudolf D. Delamere.
by H. J. S. Dennison
Atty.

Aug. 25, 1931.   R. D. DELAMERE   1,820,301
MEANS FOR CUTTING PLASTIC SUBSTANCES
Filed June 28, 1928   2 Sheets-Sheet 2

Inventor.
Rudolf D. Delamere

Patented Aug. 25, 1931

1,820,301

UNITED STATES PATENT OFFICE

RUDOLF D. DELAMERE, OF TORONTO, ONTARIO, CANADA, ASSIGNOR TO DELAMERE AND WILLIAMS, OF TORONTO, CANADA

MEANS FOR CUTTING PLASTIC SUBSTANCES

Application filed June 28, 1928. Serial No. 289,057.

The principal objects of this invention are, to facilitate the handling of plastic substances, such as soap or clay, which require to be severed in uniform lengths from a continuous bar being projected from an extruder, and to provide a machine which will cut through the bar while it is in motion, with the least possible distortion of its longitudinal shape, thereby overcoming many of the difficulties met with in the dieing or pressing of the several lengths.

The principal feature of the invention consists in the novel construction of the mechanism which is capable of movement with the travelling bar projected from the extruder and which carries the strip of material to and through a revolving cutter member, and whereby the longitudinal movement of the cutter device is utilized to control the operation of the coinciding mechanisms.

In the drawings, Figure 1 is a side elevational view of the rigid supporting frame and the movable carriage, a portion of the cutter mechanism being removed from the carriage.

Figure 2 is an elevational detail of a portion of the carriage showing the cutter device in place thereon.

Figure 3 is an elevational view of the carriage removed from the frame and seen from the opposite side to that shown in Figure 2.

Figures 4, 5:
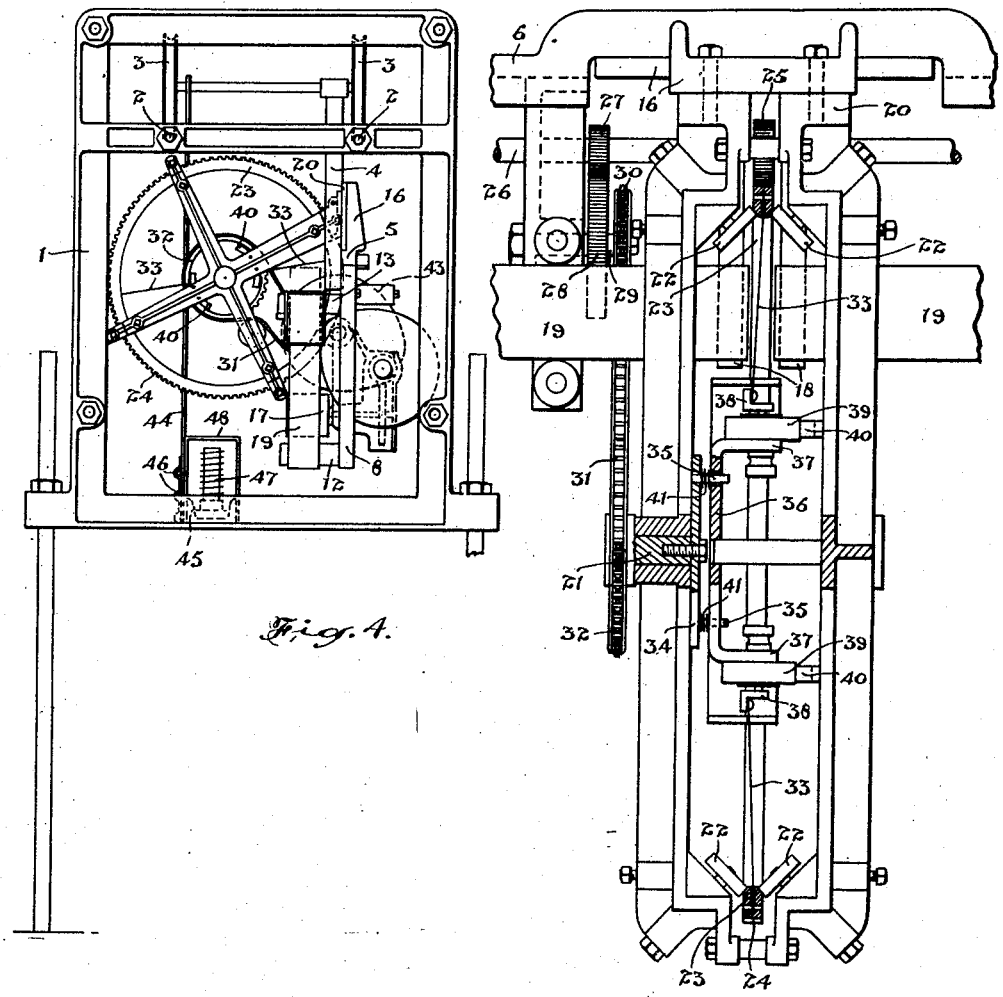
Figure 4 is an elevational detail taken from one end of the frame.
Figure 5 is an enlarged elevational and part sectional detail of the cutter device.

In the manufacture of soap the plastic substance is projected from the die of the plodder in the desired longitudinal shape and the continuously extruded material is required to be severed into uniform lengths to be pressed into the desired form of cake and it is important to have the amount of material in each piece of uniform weight and dimensions.

The present invention has been particularly devises to accomplish this result and it comprises a frame 1 which is provided with a pair of paral'elly arranged rods 2 adjacent to the top extending lengthwise of the frame and forming a trackway.

Upon the trackway are mounted the wheels 3 which are connected together in pairs and support the hangers 4 which carry a rigid frame structure 5.

The frame 5 is formed with a top bar 6 and bevelled end members 7 and 8 connecting with the bottom bar 9.

A roller or belt pulley 10 is mounted at the juncture of the bars 6 and 7.

Pulleys 11 and 12 are mounted at each end of the bottom bar 9 and a pulley 13 is adjustably mounted in a slot 14 at the end of the bar 6 adjacent to the end bar 8.

A pulley 15 is mounted below the top bar 6 adjacent to the adjustable pulley 13.

A plate 16 carrying a boss portion 14' rotatable in the frame 5 and suitable clamping bolts indicated at 15' extend through concentric slots 16' here shown in plate 16 into the frame 5 and securely clamp the plate 16 in adjusted positions on the frame. The plate 16 carries at its lower end between the pulleys 11 and 12 and slightly above the bottom bar 9 of the frame, a pulley 17 and a pair of roller pins 18 are mounted on the plate 16 in closely spaced relation above the pulley 17 and in horizontal alignment with the top surfaces of the pulleys 10 and 13.

A conveyer belt 19 extends around the pulley 17 and passing between the roller pins 18 it extends in both directions toward the ends of the frame and passes around the pulleys 10 and 13, the pulley 15 and the pulleys 12 and 11.

It will be seen that the top stretch of this conveyer belt extends from the pulley 10 to the nearest of the pins 18 and passing down around the pulley 17 it extends around the adjacent pin 18 and then continues in the same plane to the pulley 13. The belt thus forms a moving platform to support the bar of plastic material that is being handled, but a slight gap in the support is made between the pins 18.

A frame 20 here shown in the form of a pair of parallelly arranged cross arms, is mounted on the plate 16 and in a position in oblique relation to the gap in the conveyer.

Mounted intermediately of the length of the side bars of the frame 20 is a spindle 21 which is operatively connected with the centre structure of the cutter wheel.

Rollers 22 are mounted in angularly disposed supports at each end of the frame 20 and these bear against the angular faces of the rim 23 of the cutter wheel structure.

The rim 23 is formed with spur gear teeth 24 on its periphery and a spur pinion 25 mounted transversely in the frame 20 meshes with the teeth 24.

A shaft 26 carrying the pinion 25 is provided with a pinion 27 meshing with a gear 28 carried on a shaft 29 and on this shaft is mounted a sprocket wheel 30.

A sprocket chain 31 connects the sprocket 30 with a sprocket 32 on the outer end of the spindle 21.

This arrangement of gearing is adapted to drive the cutter member from the centre and from the rim, both moving in co-ordinated speeds so that the fine cutter wires 33 which extend from the rim 23 inwardly and are connected to the central structure of the wheel will not be required to carry the load of the supporting rim.

In the centre structure the spindle 21 carries a flange 34 which is provided with a pair of parallelly arranged pins 35 spaced equidistant from the centre.

A bar 36 is slidably mounted on the pins 35 and is provided with inwardly bent ends 37 to which are secured the bracket members 38 which support the inner ends of the cutting wires 33.

Rollers 39 are mounted on the brackets 38 adjacent to the ends 37 of the bar 36 and these rollers are in the rotation of the cutter member adapted to engage the cam members 40 which are mounted on the side members of the frame.

The angular position of the frame 20, relative to the movable frame 5, may be adjusted to alter the obliquity of the plane of movement of the cutter wires which compensates for the movement of the plastic material during the cutting operation and effects a substantially true cut at right angles to the longitudinal plane of the bar being severed. This adjustment is effected by loosening the clamping bolts 15' and rotating the plate 16 on its hub 14' in the frame 5 to move the frame and cutter carried thereby to the desired angle, the bolts 15' being again tightened to retain the cutter securely in this position.

The conveyer belt is arranged in alignment with the cutter wheel between the rim and the central hub portion but the wires swing through the space arranged between the pins 18.

The arrangement of the cams 40 is such as to move the bar 36 and consequently the inner ends of the cutter wires relative to the speed of movement of the plastic bar carried by the conveyer 19. This movement of the inner end of the wires is for the purpose of increasing the angle of obliquity by accelerating the movement of the inner end of the wire to compensate for the outer portion which is moving at a higher circumferential rate of speed. The rollers 39 mounted on the bar 36 are held in contact with the cams by coil springs 41 surrounding the pins 35.

The driving mechanism of the various parts is all linked together and operates from the one source which is a small electric motor 42 mounted on the back of the plate 16 and connected with a spur gear arranged within the casing 43.

The shaft 26 is driven by the gear in the casing 43 which in turn drives the connections to the cutter member described and through a train of gears, illustrated in dotted lines in Figure 4, the pulley 17 is operated to positively drive the conveyer belt 19 at a fixed speed.

The fine wire cuts with a slicing movement and severs the plastic bar without any loss whatsoever and as the edges are cut clean there are no unequal surfaces to bind in the die into which the severed piece is ultimately passed for moulding.

The carriage formed by the frame 5 supporting the cutter mechanism is movable on the frame 1 and pivotally connected to one of the axles of the wheels 3 is an arm 44 which is pivotally connected at its lower end to the bar 45 of the frame.

Mounted on the arm 44 are a plurality of mercury contact tubes 46 which when the arm 44 is inclined in one direction closes electric circuits and when in another position opens said circuits.

A plurality of electric resistance wires 47 are arranged in a suitable enclosure 48 on the frame and the switches 46 are connected with these resistances in such a manner as to vary the current flowing to the electric motor 42.

The electric motor is of a variable speed type and is geared to operate the conveyer belt 19 at a speed substantially the same as the speed of discharge from the extruder forming a plastic bar to be cut.

In the event of the speed of the motor decreasing below the speed of the discharge from the extruder, the movement of the plastic bar will cause the frame 5 to be moved longitudinally within the frame 1. This movement will swing the arm 44 on its pivot and it will operate one of the mercury tube switches to effect an increase in speed of the motor so that the speed of the conveyer belt will be uniform with that of the plastic bar.

The speed of advance of the extruder varies within certain limits and by this arrangement of switches the speed of the conveyer belt may be regulated to alter within those limits to ensure the cutting of the same lengths of cakes from the bar.

The mechanism is extremely sensitive, yet it is thoroughly reliable and by reason of its accurate and uniform cutting it eliminates a great many difficulties and delays met with in the ordinary handling of plastics in the preparation of same to form cakes or blocks.

What I claim as my invention is:

1. Means for cutting plastic substances, comprising the combination with means for feeding a strip of plastic material to be cut, of a frame movable longitudinally of the fed strip, a rotatable cutter, means mounted on said movable frame for supporting said rotatable cutter in a position to intersect the path of said plastic strip, and means controlled by the longitudinal movement of said frame for regulating the operation of the machine.

2. Means for cutting plastic substances, comprising the combination with means for feeding a strip of plastic material to be cut, of a carriage displaceable longitudinally of the fed strip, a conveyer mounted on said carriage adapted to receive the moving strip of plastic material, said conveyer having a gap intermediate of its length, means for driving said conveyer, a rotatable cutter supported in a position to cut through the plastic material at the gap in said conveyer, and means actuated by the longitudinal displacement of said carriage for controlling the conveyer driving means.

3. Means for cutting plastic substances, comprising the combination with means for feeding a strip of plastic material to be cut, of a frame, a carriage mounted in said frame and displaceable longitudinally of the fed strip, a conveyer mounted in said carriage and receiving the moving strip of plastic material, said conveyer having a gap intermediate of its length, means for driving said conveyer, means for regulating the speed of said driving means in accordance with the longitudinal displacement of said carriage, and a rotatable cutter mounted on said longitudinally displaceable carriage in position to operate through the gap in said conveyer.

4. Means for cutting plastic substances, comprising the combination with means for feeding a strip of plastic material to be cut, of a frame, a carriage movably mounted in said frame, an endless conveyer mounted on said carriage and having a gap arranged intermediate of its length, a rotary cutter arranged upon said carriage and operating through said gap to cut the plastic material carried by said conveyer, a motor operating said conveyer, and means for controlling the speed of the motor connected with said carriage and with said frame and adapted to operate in accordance with the movement of the carriage in relation to the frame.

5. Means for cutting plastic substances, comprising the combination with means for feeding a strip of plastic material to be cut, of a frame, a carriage movably mounted in said frame, an endless conveyer mounted on said carriage and having a gap arranged intermediate of its length, a rotary cutter arranged upon said carriage and operating through said gap to cut the plastic material carried by said conveyer, an arm pivotally connected to said frame and operatively engaging said carriage to be swung on its pivot by the movement of the carriage, and a plurality of make and break electrical contacts operated by the movement of said arm adapted to effect the control of the motor to regulate the speed of movement of said conveyer in accordance with the speed of movement of the plastic material.

6. Means for cutting plastic substances, comprising the combination with means for feeding a strip of plastic material to be cut, of a rigid frame having a longitudinal trackway, rollers mounted on said trackway, a frame suspended from said rollers forming a movable carriage, an endless conveyer mounted on said frame and having a gap intermediate of its length, a rotatable cutter carried by said carriage and operating through the gap in said conveyer, an electric motor operatively connected with said conveyer and said cutter, an arm pivotally connected to the rigid frame and operatively engaging said carriage and adapted to be swung by the movement of said carriage, a plurality of mercury make and break contacts arranged on said arm, and means connected with said contacts for controlling the speed of the motor.

7. Means for cutting plastic substances, comprising the combination with means for feeding a strip of plastic material to be cut, of a frame supported adjacent to said feeding means having a pair of rollers arranged in horizontal alignment, a plurality of other rollers, a single endless conveyer belt extending around said rollers having a gap in its upper length, a frame projecting laterally from the roller supporting frame, a rotary cutter mounted on said laterally extending frame and operating transversely of said conveyer having its cutting members arranged to pass through the gap in said conveyer, an electric motor carried on said frame, and means operatively connecting said motor with said conveyer belt and with said rotary cutter.

8. Means for cutting plastic substances, comprising the combination with means for feeding a strip of plastic material to be cut, of a frame mounted adjacent to said feeding means, an endless conveyer having a horizontal section arranged with a loop therein forming a gap, means for driving said conveyer, a frame extending laterally from the aforesaid frame, a spindle mounted in the latter frame, an arm carried on said spindle, a rim rotatably supported on said frame and concentric with said spindle, cutter members extending radially between said arm and said rim, means for separately driving said rim and said arm in unison, and means for operating said endless belt in synchrony with said rotatable cutter device.

9. Means for cutting plastic substances, comprising the combination with means for feeding a strip of plastic material to be cut, of a frame mounted adjacent to said feeding means, an endless conveyer having a horizontal section arranged with a loop therein forming a gap, means for driving said conveyer, a frame extending laterally from the aforesaid frame, a spindle mounted in the latter frame, an arm carried on said spindle, a rim rotatably supported on said frame, cutter wires secured to each end of said arm and to said rim and adapted to extend through the gap in the conveyer, means for rotating said arm and rim at a synchronized speed, and means for changing the position of the wires in an axial direction.

10. Means for cutting plastic substances, comprising the combination with means for feeding a strip of plastic material to be cut, of a frame mounted adjacent to said feeding means, an endless conveyer having a horizontal section arranged with a loop therein forming a gap, means for driving said conveyer, a frame extending laterally from the aforesaid frame, a spindle mounted in the latter frame, an arm carried on said spindle, a rim rotatably supported on said extending frame, cutter wires secured to each end of said arm and to said rim and adapted to extend through the gap in the conveyer, means for rotating said arm and rim in a synchronized speed, cam members carried on the frame, rollers mounted on the arm connected to said cutter wires, and spring means for holding said arm with its rollers in contact with said cams.

11. Means for cutting plastic substances, comprising the combination with means for feeding a strip of plastic material to be cut, of a frame mounted adjacent to said feeding means, an endless conveyer having a horizontal section arranged with a loop therein forming a gap, means for driving said conveyer, a frame extending laterally from the aforesaid frame, a spindle mounted in the latter frame, an arm carried on said spindle, a rim rotatably supported on said frame concentric with said spindle, cutter members extending radially between said arm and rim, means for driving said rim and said arm in unison, a motor, a gear train operated by said motor having a pinion meshing with gear teeth on said rim, and a train of gears operatively connecting said spindle with said motor to operate said spindle at a speed synchronous with that of the rim.

12. Means for cutting plastic substances, comprising the combination with means for feeding a strip of plastic material to be cut, of a conveyer adapted to receive the moving strip of plastic material, said conveyer having a gap intermediate of its length, means for driving said conveyer, means for regulating the speed of said driving means in accordance with the speed of movement of the strip of plastic material, a frame adjustably mounted adjacent to the gap in said conveyer, a rotatable cutter mounted in said frame and having its cutting members moving obliquely through the gap in said conveyer, said frame being adjustable to vary the obliquity of said cutter.

13. Means for cutting plastic substances, comprising the combination with means for feeding a strip of plastic material to be cut, of a frame movable longitudinally of the fed strip, a conveyer supported on and movable longitudinally relative to said frame and supporting the strip of material while being cut, and a rotatable cutter mounted on said movable frame and intersecting the path of travel of said plastic strip.

14. Means for cutting plastic substances, comprising the combination with means for feeding a strip of plastic material to be cut, of a frame movable longitudinally of the fed strip, a rotatable cutter mounted on said movable frame and intersecting the path of travel of said plastic strip, a conveyor belt mounted on said frame, means for operating said conveyor belt, and means controlled by the longitudinal movement of said frame for controlling the relative speed of travel of said belt and fed plastic strip.

15. Means for cutting plastic substances, comprising the combination with means for feeding a strip of plastic material to be cut, of a frame movable longitudinally of the fed strip, a rotatable cutter mounted on said movable frame and intersecting the path of travel of said plastic strip, a conveyor belt mounted on said frame, means for operating said conveyor belt, and means controlled by the longitudinal movement of said frame for controlling the speed of operation relative to the speed of travel of the fed plastic strip.

16. Means for cutting plastic substances, comprising the combination with means for feeding a strip of plastic material to be cut, of a frame movable longitudinally of the fed strip, a rotatable cutter mounted on said movable frame and intersecting the path of travel of said plastic strip, a conveyor belt mounted on said frame, means for operating said conveyor belt, and means for equalizing the speed of travel of said conveyor belt with the speed of travel of said fed plastic strip.

17. Means for cutting plastic substances, comprising the combination with means for feeding a strip of plastic material to be cut, of a carriage displaceable longitudinally of the fed strip, a conveyer mounted on said carriage adapted to receive the moving strip of plastic material, said conveyer having a gap intermediate of its length, means mounted on said carriage for driving said conveyor, a rotatable cutter mounted on said carriage and adapted to cut through the fed strip of plastic material at the gap in said conveyor, means for rotating said cutter, and means actuated by the longitudinal displacement of said carriage for controlling the operation of said cutter and conveyor driving means.

18. Means for cutting plastic substances, comprising the combination with means for feeding a strip of plastic material to be cut, of a carriage displaceable longitudinally of the fed strip, a conveyer mounted on said carriage adapted to receive the moving strip of plastic material, said conveyer having a gap intermediate of its length, means mounted on said carriage for driving said conveyer, a rotatable cutter mounted on said carriage and adapted to cut through the fed strip of plastic material at the gap in said conveyer, said cutter being operatively connected with said conveyer driving means to operate in unison therewith, and means actuated by the longitudinal displacement of said carriage for controlling the operation of said conveyer driving means.

RUDOLF D. DELAMERE.